US006419495B1

(12) United States Patent
Lehmkuhl

(10) Patent No.: US 6,419,495 B1
(45) Date of Patent: Jul. 16, 2002

(54) EDUCATIONAL DESK MAT, SYSTEM AND METHOD FOR MOTIVATING AND INSTRUCTING STUDENTS

(76) Inventor: Linda Kaye Lehmkuhl, P.O. Box 87, Bagdad, AZ (US) 86321

( * ) Notice: Subject to any disclaimer, the term of this patent is extended or adjusted under 35 U.S.C. 154(b) by 0 days.

(21) Appl. No.: 09/781,521

(22) Filed: Feb. 12, 2001

(51) Int. Cl.[7] .............................................. G09B 19/00
(52) U.S. Cl. ........................ 434/238; 434/365; 434/428
(58) Field of Search ................................ 434/236, 238, 434/365, 237, 408, 413, 416, 421, 428, 430; 273/236, 240

(56) References Cited

U.S. PATENT DOCUMENTS

| | | | |
|---|---|---|---|
| 1,400,887 A | 12/1921 | Liebman | |
| 2,503,130 A | 4/1950 | Poritz | |
| 2,954,616 A | 10/1960 | Mogard | |
| 2,965,978 A | * 12/1960 | Olson | .......................... 434/238 |
| 3,099,095 A | 7/1963 | Fallingborg et al. | |
| 3,212,201 A | 10/1965 | Jensen | |
| 3,662,477 A | 5/1972 | Weinstein | |
| 4,533,329 A | 8/1985 | Jones et al. | |
| 5,573,404 A | * 11/1996 | Stawski, II | .................. 434/238 |
| 5,577,915 A | * 11/1996 | Feldman | ...................... 434/238 |
| 5,626,477 A | 5/1997 | Adkison | |
| 5,707,238 A | 1/1998 | Bush | |
| 5,725,381 A | * 3/1998 | Kollath et al. | ............... 434/238 |
| 5,741,561 A | 4/1998 | Lenkin | |
| 5,954,512 A | * 9/1999 | Fruge | .......................... 434/238 |
| 5,971,761 A | 10/1999 | Tillman, Sr. | |
| 6,129,550 A | 10/2000 | Culberson et al. | |

* cited by examiner

Primary Examiner—Kien T. Nguyen
(74) Attorney, Agent, or Firm—Jeffrey Weiss; Harry M. Weiss; Weiss & Moy, P.C.

(57) ABSTRACT

An educational desk mat, system and method for motivating and instructing students includes a merit indicator on a desk mat that is readily visible on a student's desk. The system includes a desk mat for each student and a behavior chart for a teacher. Individual merit indications from the desk mats are recorded on one or more behavior charts, permitting the teacher to track the merit indicators of each student over a school term or other time period. The education desk mat, system and method are also useful in home or homeschooling environments.

15 Claims, 2 Drawing Sheets

EDUCATIONAL DESK MAT, SYSTEM AND METHOD FOR MOTIVATING AND INSTRUCTING STUDENTS

BACKGROUND OF THE INVENTION

1. Field of the Invention

The present invention relates generally to educational aids, and more specifically to a desk mat, system and method for motivating and instructing students.

2. Background of the Invention

A variety of educational aids are currently marketed to assist educators in motivating and instructing students. These educational aids are typically purchased by teachers for use in classrooms by both students and the teacher.

Educational aids may take the form of books, charts, puzzles, etc., which either provide information or test students for knowledge. A convenient mechanism to provide information to a student is a chart, generally affixed to a wall in the classroom. Also available are strips containing educational information, such as the letters of the alphabet, which strips may be affixed to a desk. This focal point is generally superior to a wall chart, as each student has ready access to the information. When a wall chart is used, the chart is out of the direct focus of attention of students, especially younger ones. However, with both strips and wall charts, the focus is solely on providing information, and not also on modifying behavior. Also, strips that are affixed to a desk can become warn and tattered, and also interfere with the cleaning of the desk top.

Some teachers will also use products such as stickers, pencils, erasers, small prizes and similar items as rewards to motivate and reward positive student behavior. But many teachers and other professionals view these as little more than bribes, which encourage students to the right thing for the wrong reason, yield only short term results. These are also expensive, and teachers frequently find it necessary to pay for them out of their own pockets. The use of prizes can also create a circus atmosphere in the classroom.

Disciplinary systems are typically managed by the teacher, and the relevant information—such as grades and behavior records—is retained by the teacher. Students do not manage disciplinary systems, and as a result they are not continually in the focus of the students.

Behavior modification systems should provide a mechanism for a teacher to reward desired behavior and/or to warn a student of undesired behavior, without resorting to bribery, creating an unruly environment, or creating an undue expense. Such a system should also be within the focus of the students—individually and as a group. And, further, such system should provide educational information as well as behavior modification.

Therefore, it would be desirable to provide an improved desk mat, system and method for motivating and instructing students and modifying their behavior.

SUMMARY OF THE INVENTION

The above objective of instructing and motivating students is achieved in a desk mat, system and method. The desk mat includes a merit indicator that indicates at least one of either a reward or a warning. The desk mat is adapted for placement on a student's work surface so that he or she is reminded of their reward or warning level when he or she looks. at their work surface. The system may include multiple desk mats and, preferably, at least one behavior chart. The behavior chart is used by a teacher to collect merit indications according to information recorded on each of the individual desk mats.

BRIEF DESCRIPTION OF THE PREFERRED EMBODIMENTS

In accordance with one embodiment of the present invention; a desk mat for the top of a student's desk is provided. The desk mat contains a merit indicator that indicates at least one of either a reward level or a warning level. The desk mat is adapted for placement on a student's desk so that he or she is reminded of their reward and/or warning level when he or she looks at their desktop.

In accordance with another embodiment of the present invention, a system including multiple desk mats and a behavior chart are provided within a classroom to permit the teacher to track student's merit indications over time.

In accordance with another embodiment of the present invention, a method for motivating students by providing an immediately accessible indication of merit on the students' desktops is implemented.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

The present invention concerns an instructional and behavior modification system, the centerpiece of which is a desk mat 10 (see FIG. 1) adapted to be positioned on the desk of each student (anywhere from one student to a classroom full of students) using the system. The placement of the desk mat 10 on the student's desk places the desk mat 10 directly in the focus of the student, giving every student a "front row" advantage and is particularly of benefit for "special needs" or "visually challenged" students.

The desk mat 10 is preferably markable, and therefore plastic desk mats or desk mats printed on paper and then laminated with plastic sheeting are desirable for repeated use. Paper desk mats can be printed in pads and are desirable for disposable use. Disposable paper mats are made even more useful in conjunction with work surfaces having a glass or plastic transparent top, where the paper mat may be inserted beneath the top of the work surface. The work surface can then be marked on and subsequently erased, without permanently altering the mat. Mats can also be made with a magnetic backing or felt board, providing a surface to which marker objects are detachably held. The desk mat 10 may have a sticky backing or other attachment mechanism for ensuring stability of the mat on a slanted desk. For example, VELCRO tabs may be used to affix the desk mat 10 to a desk.

As explained below, the desk mat 10 can be adapted as part of a behavior modification system by including at least one of a reward indicator 12 and a reminder/warning indicator 18 on the surface of the desk mat 10—and preferably by including both. These indicators 12 and 18 are preferably graphical objects printed on the desk mat 10 and are designed to receive marks from a pen, or to be covered by marker objects.

Figure 1:
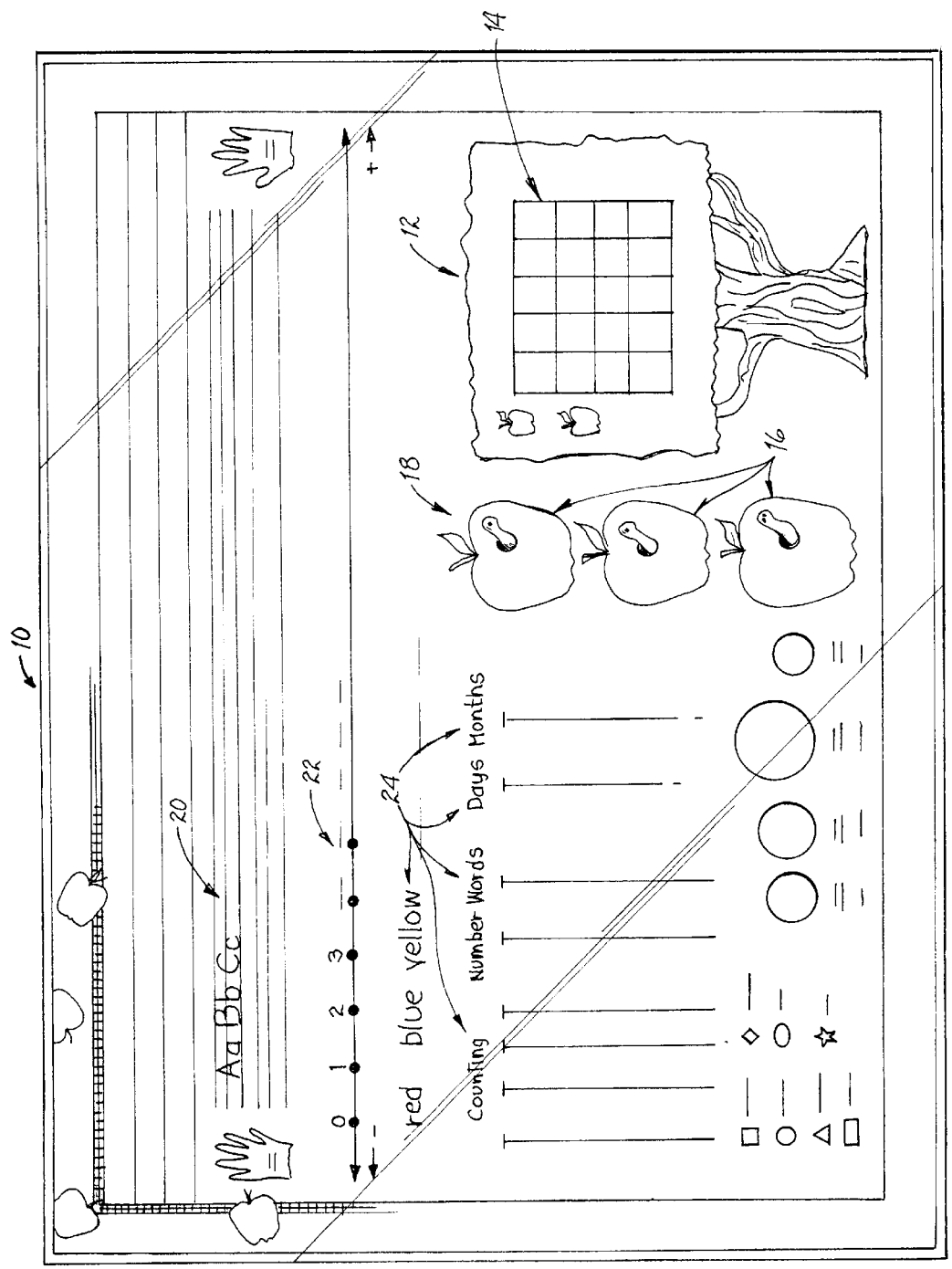
FIG. 1 is a pictorial diagram depicting a desk mat in accordance with a preferred embodiment of the present invention.

An exemplary desk mat 10 having indicators 12 and 18 is depicted in FIG. 1. Reward indicator 12 is preferably a graphical object and is used to indicate a reward level. Within reward indicator 12 are markable blocks 14. Markable blocks 14 are marked by a teacher to reward desired behavior. The blocks may be marked with an "X," a star, or other graphical object, or affixable stickers having attention-drawing impact may be used. As the student looks at their desk mat, there is a repeated reward associated with viewing the markings in reward indicator 12. The rewards can be given out all at the end of a day, or as individual desired behaviors are noted. Reward markers can be used to motivate students by a teacher allowing the classroom to see that a marker is "in hand" and ready to be awarded to a student who is "on task." For example, the teacher may award markers to a student who has completed an assignment or to students who are at their desk and working, rather than to students who are away from their desks or are talking during times they should be at their desk and working. A marker may be awarded to a student who has only had one or no graphical objects 16 (described below) uncovered during the course of the day. Preferably, the graphical object constituting the reward indicator 12 depicts a living tree, although of course other images could be depicted without departing from the spirit or scope of the present invention.

Desk mat 10 preferably also includes a reminder/warning indicator 18, which preferably includes three graphical objects 16 as depicted. In the present exemplary embodiment, graphical objects 16 are of different colors, but of identical graphics. It may be desirable to vary the graphics between objects to indicate severity of a warning level. Color is used in the present embodiment to indicate warning levels via a red-yellow-green color scheme for graphical objects 16, with green being the first warning level and red being the final warning level. In the preferred embodiment, graphical objects 16 depict worm-ridden apples to evoke a response from the student that graphical objects 16 indicate undesired past behaviors—though images other than worm-ridden apples could of course be used. As the student looks at their desk mat, there is a repeated warning associated with viewing the markings in reminder/warning indicator 18.

The warning level indicated by reminder/warning indicator 18 in the present exemplary embodiment is adjusted by uncovering graphical objects 16. At the beginning of a classroom session, or other suitable period, graphical objects 16 are all covered by removable marker objects. These can be buttons in the shape of the graphical object 16, plastic chips, coins or other objects made of suitable material and can be kept by the teacher in a canister as they are collected. As the teacher determines that a student's warning level requires adjustment, the teacher may remove a marker object from one of the student's graphical objects 16 on that student's desk mat 10 and return it to the canister. For example, the teacher may remove a marker from one of graphical objects 16 when a student is talking in class while they should be working, or when a student is not doing their assigned work. While it is preferred that the graphical objects 16 be permanently depicted on the desk mat 10 and then uncovered as necessary, it would be possible for the graphical objects 16 to be in sticker or other form and placed on the desk mat 10 as necessary. If desk mat 10 is made with a magnetic backing, the marker objects can be magnetic markers, and if desk mat 10 is covered with a felt surface, the markers can be made with a compatible attaching backing. Other attachment devices such as VELCRO may be used. At the end of the school day or other period for which the reminder/warning indicator 18 is used, the graphical objects 16 should again be covered—giving each student a fresh start.

Behavior of students in a classroom can be improved by rewarding desired behavior or providing a warning in response to instances of undesirable behavior. The present invention provides the student and teacher with a visual reference of student behavior choices. Because the desk mat 10 and the information contained therein is placed directly in front of each student, it allows the student to: (a) take responsibility for the behavior choices they make; (b) see the result and the consequences for the behavior choices they make; (c) manage/modify their behavior to obtain desired results; (d) take inventory of their overall behavior choices for long-term behavior management and modification. In this regard, the present invention is part of an overall training process that focuses primarily on the internal growth and development of each student and the overall class in the areas of responsibility and self-discipline. It also helps to create a caring classroom environment.

Students can be focused on the expected classroom behavior with a set of classroom rules, which preferably should be displayed in the classroom. An example set of rules for providing a caring classroom environment could include the following:

1. Take care of yourself
2. Take care of your neighbor
3. Take care of your teacher(s)
4. Take care of your classroom
5. Take care of your playground and school To assist teachers in the use of the present invention, an instruction guide and/or demonstration video can also be provided. These would explain the present invention and the manner in which it is (or may be) employed.

Educational information is preferably included within desk mat 10. Such information may include writing/lettering chart 20, number line 22 and lists 24. Types of lists 24 may include, but are not limited to: numbers, names of colors, days of the week, shapes, coins, and months of the year. The subject matter included will depend on the grade level with which the desk mat 10 is used with the educational information being grade appropriate. Obviously, then, the subject matter contained can be expected to change from a desk mat used for first graders, to one used for kindergartners, to one used for second graders, etc. The inclusion of needed classroom information on the desk mats calls the attention of the students to their desk mats repeatedly during a classroom session, also calling the attention of the students to their merit indicators repeatedly throughout the day. The student's name may also be recorded in a special location provided within desk mat 10.

Figure 2:
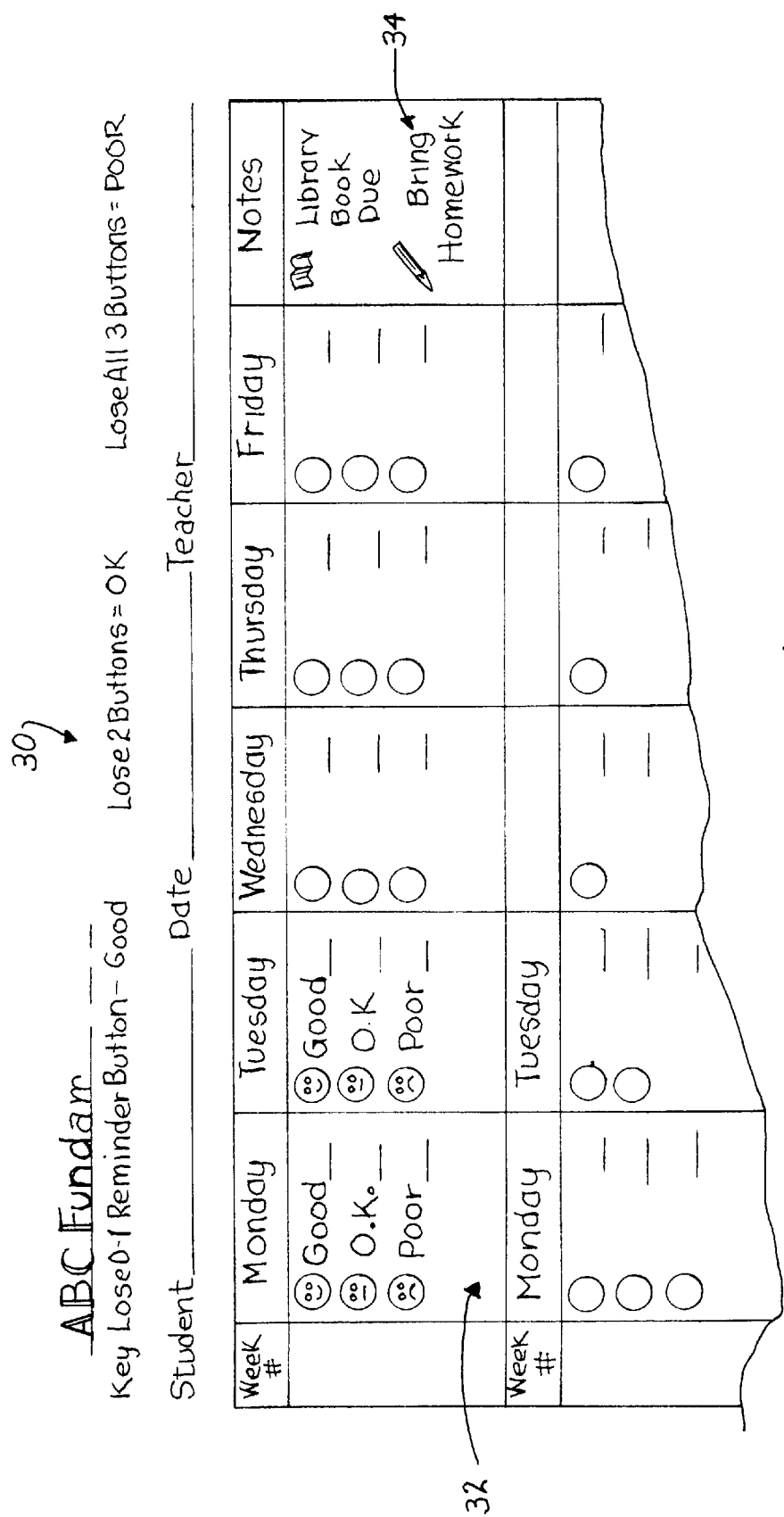
FIG. 2 is a pictorial diagram depicting a behavior chart in accordance with a preferred embodiment of the present invention.

At the end of the classroom session, the teacher may record the merit indicators from each of the desk mat in a behavior chart 30 as depicted in FIG. 2. Behavior chart 30 includes locations 32 for recording the warning level of students, but may also be adapted for recording reward levels or another indication calculated from a combination of reward levels and warning levels.

Locations 32 preferably include graphical depictions of human faces, providing a quick indication to the teacher of the warning level recorded and a graphical reminder to the student (when shown past records) of prior recorded behavior. In the present exemplary embodiment, locations 32 include three levels of warning: good, o.k., and poor, corresponding to the three levels of warning in reminder/warning indicator 18 of FIG. 1. Behavior chart 30 may also include important teacher reminders 34 for an individual student, such as homework assignments and library book status for a given time period.

The behavior chart 30 can be used to monitor, manage, modify and report a student's overall behavior choices. It can, optionally, be provided to the student's parents on a regular (e.g., weekly) basis to inform and involve parents in the behavior management process. In this regard, while teachers are encouraged to keep parents informed, it has been virtually impossible in the daily hustle and bustle of the classroom to record every incident and behavior decision for subsequent reporting - something that the behavior chart 30 makes possible. The behavior chart 30 can also be saved as a permanent document in the student's school file for documentation of a child's behavioral growth and development. The behavior chart 30 can also be provided to the student, perhaps as a reward certificate if it reflects that the student has behaved in a particularly positive way.

The above-described exemplary embodiments of desk mat 10 and behavior chart 30 form a system that is integrated to facilitate classroom use. By unifying reward indicators 12 and/or reminder/warning indicator 18 for reminding students within a time period with appropriate recording locations 32 to permit a teacher to record behavior over groups of time periods, short-term reinforcement along with long-term tracking of behavior is achieved in a unified and easy to use system and method.

A wall chart that is essentially an enlarged duplicate of the desk mat may be hung on the wall of the classroom for demonstrational and reminder purposes. This chart may comprise a large felt board or backed with magnetic material to hold marker objects. Alternatively or in conjunction, a transparent version of the desk mat may be used with an overhead projector to display a projection of the mat on a screen or wall for demonstration purposes.

Although the system and desk mat have been described for use in a classroom environment, an alternative preferred embodiment of the invention may be used in the home environment or home-schooling environment. In this application, the system generally comprises only one desk mat and there may or may not be an associated behavior chart. If a behavior chart is used, it will be generally maintained by a parent or guardian of a child. References to desk mat are to be understood to contemplate any work surface that is used by a student and the invention is not restricted to a typical student desk. Surfaces such as the floor, tables, and special work surfaces can be useful environments for the present invention.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A system for use in a teaching environment, said teaching environment having at least one student provided with a work surface, wherein said system comprises:
   at least one desk mat adapted to be positioned on a surface of a desk directly in front of a student seated at said desk;
   wherein said at least one desk mat contains at least one merit indicator; and
   at least one behavior chart separate from said desk mat for recording merit indicator values from said at least one desk mat.

2. The system of claim 1, wherein said at least one merit indicator indicates a reward level.

3. The system of claim 2, wherein said at least one merit indicator includes a graphical item containing markable blocks for indicating a reward level to an associated student by marking said blocks.

4. The system of claim 3, wherein said graphical item is a depiction of a living tree.

5. The system of claim 1, wherein said at least one merit indicator indicates a warning level.

6. The system of claim 5, wherein said at least one merit indicator includes a plurality of graphical items for indicating said warning level to an associated student by uncovering items within said merit indicator.

7. The system of claim 6, wherein said graphical items are depictions of worm-ridden apples.

8. The system of claim 5, wherein said at least one merit indicator includes a second merit indicator for indicating a reward level.

9. The system of claim 1, wherein said at least one behavior chart comprises a plurality of behavior charts, each of said plurality of behavior charts is associated with an unique one of said students, and wherein said behavior chart includes markable items corresponding to levels of said merit indicator for at least one time period.

10. The system of claim 9, wherein each of said markable items has a graphical depiction of a human face, and a level of said merit indicator is indicated via said graphical depiction.

11. A planar desk mat comprising:
   an exposed upper surface having graphical features implementing at least one merit indicator for indicating a merit level to an individual student;
   wherein said merit indicator indicates a warning level;
   wherein said at least one merit indicator includes a plurality of graphical items for indicating said warning level to an associated student by uncovering items within said merit indicator; and
   a concealed lower surface under said first surface, for placement conformal to a student's work surface.

12. The desk mat of claim 11, wherein said at least one merit indicator includes a second merit indicator for indicating a reward level.

13. A method of modifying the behavior of students in a classroom, wherein each of said students has a desk including a desk mat, said method comprising the steps of:
   providing a desk;
   providing a desk mat containing at least one merit indicator;
   positioning said desk mat on a surface of said desk directly in front of a student seated at said desk;
   determining that a merit indication of said student has changed;
   in response to determining that said merit indication has changed, indicating a current merit indication on said student's desk mat.

14. The method of claim 13, wherein said merit indication is a reward level, and wherein said indicating comprises marking blocks within a graphical object to indicate said reward level.

15. The method of claim 13, wherein said merit indication is a warning level, and wherein said indicating comprises uncovering graphical objects to indicate said warning level.

* * * * *